United States Patent [19]
van der Smissen et al.

[11] Patent Number: 4,822,572
[45] Date of Patent: Apr. 18, 1989

[54] CHEMICAL OXYGEN GENERATOR

[75] Inventors: Carl E. van der Smissen, Lubeck; Rainer Ernst, Curau; Wolfgang Eckstein, Sereetz, all of Fed. Rep. of Germany

[73] Assignee: Draegerwerk AG, Fed. Rep. of Germany

[21] Appl. No.: 742,606

[22] Filed: Jun. 7, 1985

[30] Foreign Application Priority Data

Jun. 14, 1984 [DE] Fed. Rep. of Germany ....... 3422021
Dec. 20, 1984 [DE] Fed. Rep. of Germany ....... 3446550

[51] Int. Cl.$^4$ .......................................... C01B 13/02
[52] U.S. Cl. .................................. 422/126; 102/530; 128/202.26; 422/120
[58] Field of Search ............... 422/120, 122, 125, 126, 422/164, 165, 166, 167; 128/202.26; 44/7.4, 7.5; 280/728, 734, 736, 737, 741; 102/530, 531

[56] References Cited

U.S. PATENT DOCUMENTS

| 3,591,343 | 7/1971 | McGoff et al. | 422/113 |
| 3,736,104 | 5/1973 | Churchill et al. | 422/120 |
| 3,981,300 | 9/1976 | Williams | 422/112 X |
| 4,111,661 | 9/1978 | Rothenberger | 422/119 X |
| 4,115,069 | 9/1978 | Martin et al. | 402/530 X |
| 4,230,667 | 10/1980 | Williams | 422/119 X |
| 4,241,485 | 12/1980 | McBride | 422/120 X |

FOREIGN PATENT DOCUMENTS 3039442 5/1982 Fed. Rep. of Germany.

Primary Examiner—Barry S. Richman
Assistant Examiner—Jill Johnston
Attorney, Agent, or Firm—McGlew & Tuttle

[57] ABSTRACT

A chemical oxygen generator for use in respirators and resuscitators for providing an oxygen reserve includes oxygen in chemically bound compacts or oxygen single-candles and the oxygen is released when needed in the course of a chemical reaction. The oxygen single candles are fitted together axially in a canister in modular construction with incandescence elements therebetween. In the cover of the canister, opposite the upper end wall of the first single candle, there is an igniting device, and in the bottom, an outlet opening for the escape of the released oxygen. As soon as the first oxygen single-candle is activated by means of the igniting device, the oxygen reaction sets in and a reaction front moves in the direction of the next single candle. The reaction transmission to the next single candle occurs through the intermediate incandescence element. By their broad abutment on the single candles to be connected by them, and by their material consistency, the incandescence elements provide shockproofness necessary for the burnoff of the single candle.

10 Claims, 2 Drawing Sheets

CHEMICAL OXYGEN GENERATOR

FIELD AND BACKGROUND OF THE INVENTION

This invention relates in general to the construction of oxygen generators and in particualr to a new and useful chemical oxygen generator using a succession of single candles having an incandescent element between successive candles.

Chemical oxygen generators are used in respirators and resuscitators for providing an oxygen reserve. In chemical oxygen generators the oxygen is present in chemically bound form and is released when needed in the course of a chemical reaction. For a controlled course of the reaction the chemical mass is present in a defined, uniform density in the form of solid substances. They are compacts in candle form. They are produced without organic binders and therefore are very brittle and hence fragile.

In a known chemical oxygen generator, the chemical mass is divided into oxygen single-candles. The total candle length needed for the respective oxygen requirement is thus subdivided into small breakageproof single compacts, which are then fitted together in modular construction.

The oxygen single-candles are lodged in a canister. They are jointed together by contact by an incandescent charge. The incandescent charge is contained in respective depressions in the end walls of the oxygen single candles. In the bottom of the canister on one end wall of a single candle the oxygen generator further has an igniting device. The opposite bottom contains an outlet for the released oxygen. The oxygen single candles are separated from each other shockproofed and heat-insulated by padding layers of a non-burnable inorganic fiber through which the incandescent charge is passed axially. The candles are held shockproof relative to the canister wall by pads of the same material.

As soon as the first oxygen single candle is activated by means of the igniting device, the oxygen reaction sets in and the reaction front moves in the direction of the next oxygen single candle but direct transmission of the reaction is prevented by the padding disc. The reaction transmission occurs by means of the incandescent charge which is passed through the disc.

The padding discs between the oxygen single candles ensure a shockproof construction. The ignition transmission through the incandescent charges could be better (German OS No. 30 39 442).

SUMMARY OF THE INVENTION

The invention provides a chemical oxygen generator which, utilizing the advantages of modular construction, also provides a guaranteed ignition transmission from one single candle to the next in adaptation to the performance requirements and shockproofness to be ensured.

In accordance with the invention the incandescent element substantially covers the end faces of the oxygen single candles to be joined.

The advantages achieved with the invention include in particular that, with the incandescence element arranged between the oxygen single candles, the shockproofness is insured and the desired incandescent heat over the entire end faces of the candles is obtained. Shockproofness is provided also at the end faces themselves. The strength of the incandescent surface is less than that of the candles and would, in case of rupture load for them, lead to crumbling. This however does not lead to interference with the incandescent transfer, which is assured by the close contact over the entire end faces.

In accordance with the invention, the chemical oxygen generator is provided which includes a canister with a hollow interior and a plurality of adjacent oxygen releasing single candles disposed in the interior in succession. In accordance with the invention, an incandescence element is positioned between and abuts against adjacent candles and transmits burning from one candle to the other. The incandescence element also forms a means for holding the candles in a shockproof manner and advantageously cover the adjacent end faces of adjacent candles.

In accordance with another embodiment of the invention, candles may be accommodated in a space saving, compact arrangement. To this end, the individual candles as well as the incandescent elements are sequentially so positioned that their axes extend in a non-linear axial line. Such a nonlinear line makes it possible to accommodate a larger number of oxygen candles and incandescent elements in series or series parallel connection, and since the intermediate incandescent elements very satisfactorily transfer the reactio front, even substantially larger lengths of candle trains may be provided.

The nonlinear axial line will advantageously be a plane curve, but is may also be space curve.

In a further development of the invention, a break or bend may be provided in the axial line, i.e. the line may be angled, at least once.

Embodiments in this regard may vary. In one embodiment with a plane axial line, a U shaped or meandering configuration may be provided. In an embodiment with a space line, a helical arrangement may be provided. Other feasible arrangements may be a triangle or a saw-toothed sequence.

A rounded U or a spiral are also possible configurations.

Basically, the most various plane or space curves may be provided individually or in any combination permitting a quite satisfactory utilization of a given space in a container.

Even individual oxygen candles having bent or angled axes themselves may be provided. Also, the nonlinear extensions of the axial line may just be obtained by interposing such angled individual candles.

Accordingly, an object of the invention is to provide an improved chemical oxygen generator which includes a plurality of incandescent candles arranged in succession with an incandescence element therebetween and which includes an ignition element at one end of the succession of the candles in an outlet advantageously adjacent the opposite end of the last candle in succession.

A further object of the invention is to provide a chemical oxygen generator which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

In FIG. 1, oxygen candles 2 are accommodated in a sheet-metal canister 1.

DESCRIPTION OF THE PREFERRED EMBODIMENTS

Figure 1:
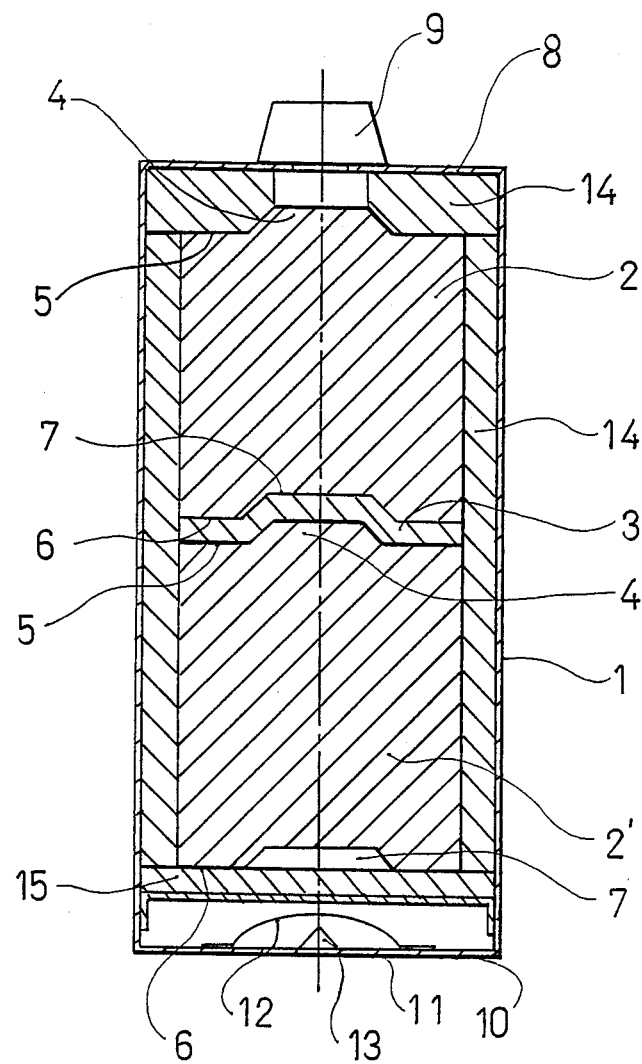
FIG. 1 shows a chemical oxygen generator built up of two individual candles and an incandescant element.

Referring to the drawings in particular the invention embodied therein, comprises a chemical oxygen generator which includes a canister 1 having a hollow interior which a plurality of adjacent oxygen releasing single candles 2,2', etc. arranged in succession with an incandescence element 3 disposed therebetween.

A plurality of single candles 2,2' etc. are lodged in a canister 1. They are joined together in succession by contact through an incandescence element 3. The incandescence element 3 is located on a matching elevation 4 on the upper end face 5 of the oxygen single candle 2. The lower end face 6 contains a matching depression 7. In the cover 8 of the canister 1 the oxygen generator has an ignitor 9 of known construction. The bottom 10 of canister 1 contains an outlet opening 11 for the escape of the released oxygen. Until the oxygen generator is used, the outlet opening 11 is closed by a foil 12. It is automatically opened by a spike 13 immediately after the start of the igniter 9 due to the pressure building up inside the canister. A pad 14 of a non-burning inorganic fiber is placed around the oxygen single candles 2. Beside forming a retention element it serves as a heat insulation element.

As soon as the first oxygen single candle 2 is activated by means of the igniter 9, the oxygen reaction sets in at the upper part. The reaction front travel in the direction of the next oxygen single candle 2. The evolving oxygen flows through pad 14 along the wall of canister 1 toward the outlet opening 11.

The reaction transmission to the next oxygen single candle 2 occurs by means of the incandescence elements 3. It is a compact charge of known materials and is ignited by the reaction heat of the first oxygen single candle 2.

Any gaseous and particulate substances forming during the reaction of the incancescence elements 3 are filtered out in a filter bed 15 at the lower end of the second single candle 2'.

Figure 2:
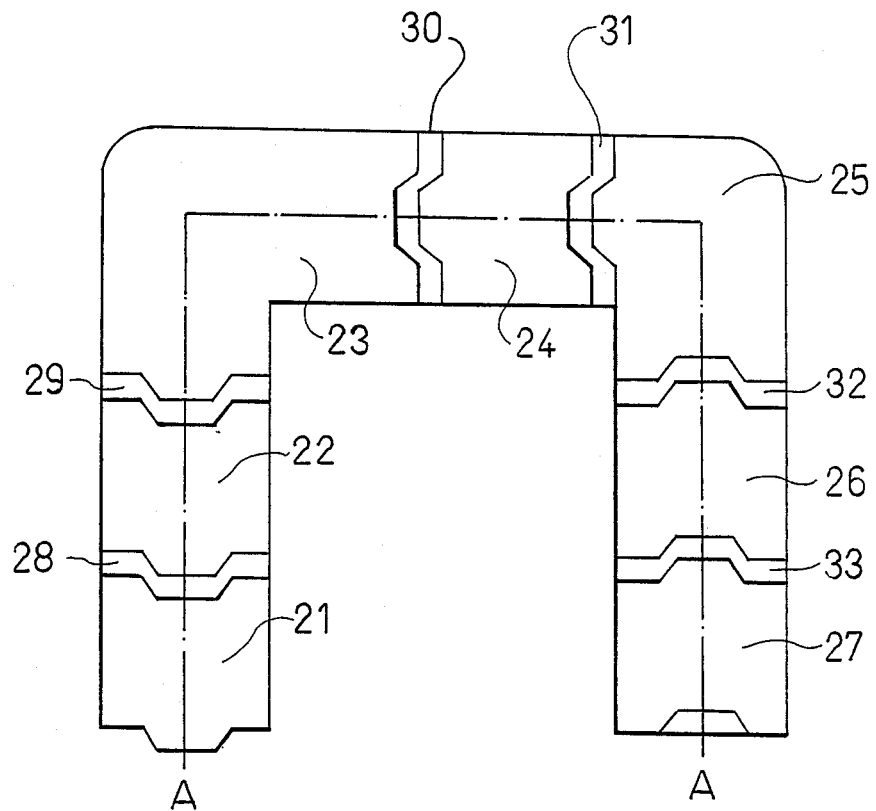
FIG. 2 shows an oxygen generator with a special arrangement of the individual candles.

FIG. 2 shows an arrangement with a candle train having a nonlinear axial line A—A in the shape of a rounded U. Between the individual oxygen candles 21 to 27, disc-shaped incandescent elements 28 to 33 are conformably received, which cover the front faces of the adjacent candles to such a large extent that a very satisfactory transfer of the reaction front is ensured.

The individual oxygen candles 23 and 25 are angled and adjoin both of the adjacent linear candle trains conformably.

The series connection of the individual oxygen candles is enclosed in a corresponding cushioning which is permeable to gas and accommodated in a canister (not shown). The canister has an outlet for the produced oxygen, and an igniter for starting the reaction.

While specific embodiments of the invention has been shown and described in detail to illustrate the application of the principles of the invention, it will be understood that the invention may be embodied otherwise without departing from such principles.

What is claimed is:

1. A chemical oxygen generator, comprising a canister having a hollow interior, a plurality of adjacent oxygen releasing single candles disposed in said hollow interior in succession, an incandescence element positioned between and abutting against adjacent candles for transmitting burning from one candle to another and for holding said candles in a shockproof manner, said incandescence element substantially covering the adjacent end faces of adjacent ones of said candles, ignition means adjacent an end of said plurality of adjacent oxygen releasing single candles for igniting and burning the first one of said candles and thereafter its adjacent incandescence element, successive candles being ignited by an associated one of said incancescent elements, and an outlet connected to said hollow interior for the discharge of the generated oxygen.

2. A chemical oxygen generator according to claim 1, wherein each of the said single candles includes one end face having a recess and an opposite end face having a projection of a size to fit into the recess with said incandescent elements being similarly shaped to fit therebetween.

3. A chemical oxygen generator according to claim 1, wherein said ignition means comprises an ignitor arranged at one end of said canister, said single candles each having a projecting portion facing towards said ignitor with the end one of said single candles being closed adjacent said ignitor and a successive candle having a projection fitting into a recess on the associated end face of the adjacent single candle, said incandescence element comprising a strip being disposed between said candles and conforming to the recess and projections of adjacent single candles and including padding disposed around the circumference of said candles between said candles and the interior of said canister of a fiber material permitting the oxygen which is generated to move along the walls of said canister, said canister having an openable end at the end remote from said ignitor for the outflow of oxygen.

4. An oxygen generator according to claim 1, wherein said oxygen candles and incandescent elements are arranged in a nonlinear axial line.

5. An oxygen generator according to claim 4, wherein said nonlinear axial line comprises a curve.

6. An oxygen generator according to claim 4, wherein said nonlinear axial line is a planar curve.

7. An oxygen generator according to claim 4 wherein said nonlinear axial line has at least one break.

8. An oxygen generator according to claim 4 wherein said nonlinear axial line comprises a curve.

9. An oxygen generator according to claim 1 wherein individual oxygen candles have portions with axes which are offset.

10. A chemical oxygen generator comprising a plurality of adjacent oxygen releasing single candles disposed in a row, an incandescence element positioned between and abutting against adjacent candles for transmitting burning from one candle to another and for holding said candles in a shockproof manner, said incandescence element substantially covering the adjacent end faces of adjacent ones of said candles, said candles being ignitable to burn in succession.

* * * * *